Nov. 11, 1958     J. Z. DE LOREAN     2,859,977
SPRING SUSPENSION FOR MOTOR VEHICLES

Filed Aug. 13, 1956     2 Sheets-Sheet 2

INVENTOR
John Z. De Lorean
BY
Redrow & Easton

United States Patent Office 2,859,977
Patented Nov. 11, 1958

2,859,977

SPRING SUSPENSION FOR MOTOR VEHICLES

John Z. De Lorean, Birmingham, Mich., assignor to Studebaker-Packard Corporation, Detroit, Mich., a corporation of Michigan Application August 13, 1956, Serial No. 603,527

1 Claim. (Cl. 280—104)

This invention relates to spring suspension systems for motor vehicles and particularly to a roll stabilizer for a torsion bar type of suspension system.

A vehicle having a torsion bar suspension system normally has levers for connecting the front and rear wheels to the frame of the vehicle and torsion bar means on each side of the frame connecting the front and rear levers on each side of the vehicle. The torsion bar means on each side of the vehicle in effect constitutes a common spring between a front and rear wheel on each side of the vehicle such that when a front or rear wheel passes over a change in elevation, there is produced a corresponding raising or lowering force to the frame at the opposite end of the vehicle. The torsion bar means thus functions to divide a lifting or lowering force transmitted from a front or rear wheel equally between the front and the rear of the frame. As a result the vehicle is maintained substantially level when rough road surfaces are encountered and pitching of the vehicle is greatly minimized.

A main object of the invention is to provide a new and improved roll stabilizer arrangement for a torsion bar suspension system.

Other objects of the invention will become apparent from the following specification, the drawings relating thereto, and the appended claim.

Figure 1:
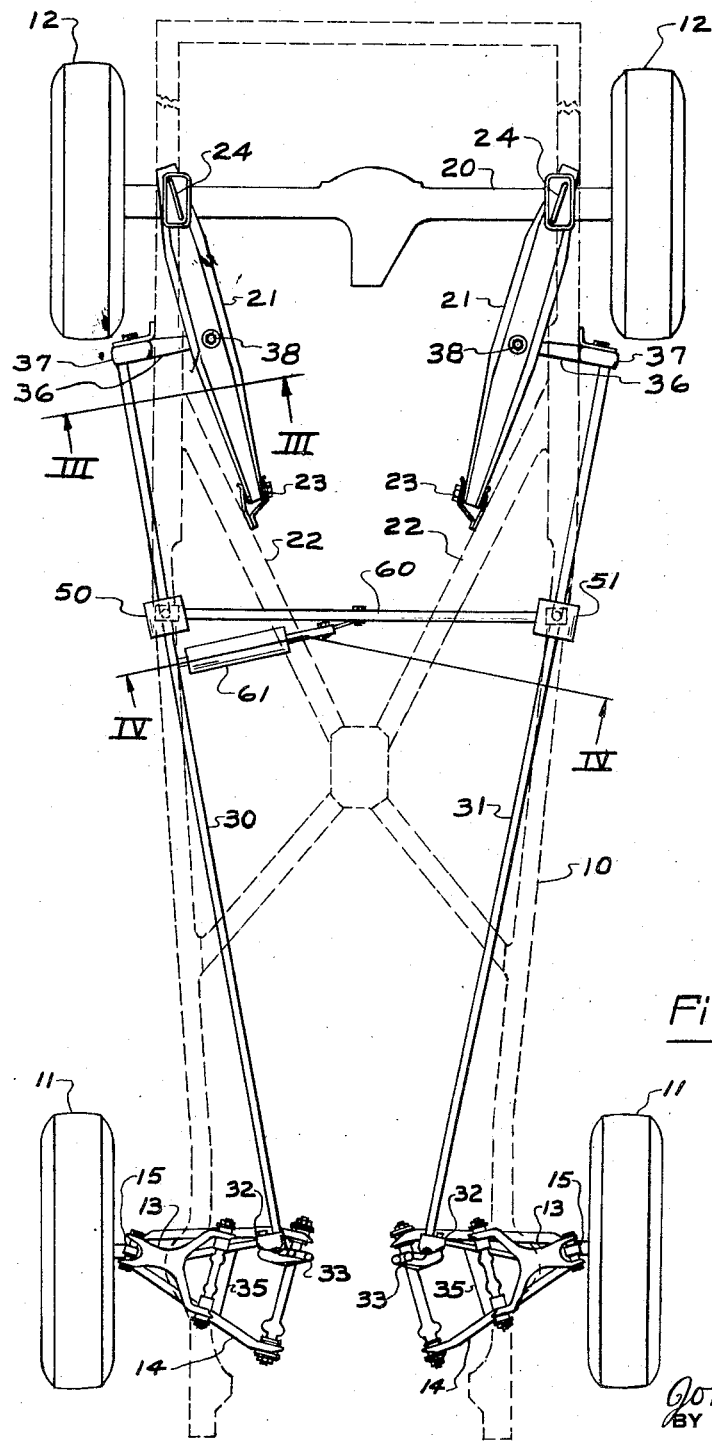
Fig. 1 is a plan view of a motor vehicle torsion bar suspension system having a roll stabilizer arrangement embodying the present invention.
Figure 2:
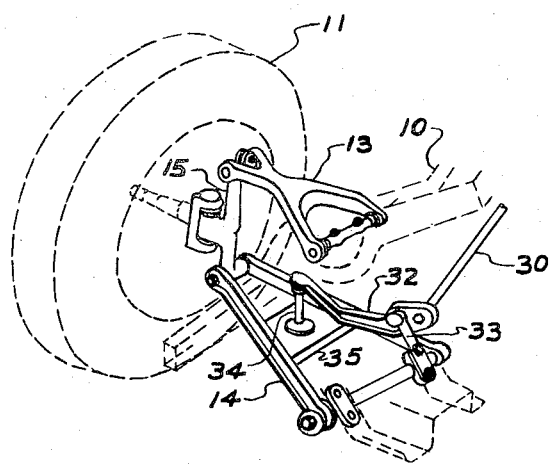
Fig. 2 is a perspective view showing the portion of the suspension system in the vicinity of the right front wheel.
Figure 3:
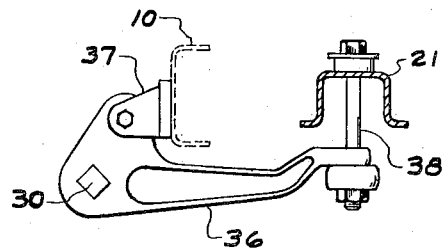
Fig. 3 is a sectional view taken on line III—III of Fig. 1.

In the drawing there is illustrated an embodiment of the present invention as applied to a vehicle having a load carrying frame 10, front wheels 11 and rear wheels 12. Frame 10 is supported on the wheels by a torsion spring suspension system having a roll stabilizer arrangement embodying the present invention.

Each of the front wheels 11 is supported by upper and lower short and long levers 13 and 14 of wishbone construction which are pivotally connected to frame 10. Each pair of lever arms 13 and 14 are mounted for swinging movement in a generally vertical plane and are joined together at their outer ends by a spindle and a king pin mounting 15 to which levers 13 and 14 are pivotally connected.

Rear wheels 12 are illustrated as having an axle assembly 20 extending therebetween although, within the scope of the invention, the rear wheels may be supported by independent axle assemblies such as those provided for the front wheels 11.

The rear wheels 12 are operably and in effect connected to frame 10 by levers 21. Frame 10 has an X-shaped strengthening portion comprising two structural members 22 to which the inner ends of levers 21 are attached by means of universal joint connections 23 for pivotal movement in generally vertical planes. The outer ends of levers 21 are fastened to axle 20 by means of U-bolt connections 24.

The particular front wheel levers 14 and the rear wheel levers 21 are disclosed herein only by way of illustration. Within the scope of the invention it is only essential that there is provided some form of lever means for connecting each of the four wheels to the frame of the vehicle which permits a generally vertical movement of each wheel relative to the frame. The location of the axes about which the levers pivot is not critical, within the scope of the invention. It is of importance, however, that each lever is caused to pivot about its axis when the wheel connected thereto is moved in a generally vertical direction relative to the frame of the vehicle.

On opposite sides of the frame 10 there are provided torsion bar spring means which are illustrated herein as torsion bars 30 and 31. Each bar 30 or 31 may be represented by a plurality of bars but one torsion bar in each side of the frame 10 is sufficient to illustrate the invention. The construction on each side of the frame 10 is symmetrical with respect to torsion bars 30 and 31 and only torsion bar 30 and apparatus associated therewith will be described in detail.

In general, torsion bar 30 extends between and is operably and in effect connected to the front and rear levers 14 and 21 on one side of the frame 10. Functionally it is of importance that the pivotal movement of levers 14 and 21, which is caused by the vertical movement of wheels 11 and 12, be translated into a torsional twisting action at the ends of torsion bar 30 which causes twisting of the torsion bar relative to its longitudinal axis. The particular means or arrangements which may be provided for connecting torsion bar 30 to the front and rear levers 14 and 21 may therefore have various forms within the scope of the invention.

The opposite ends of torsion bar 30 are in effect operably connected to frame 10, as will be described further on, and the arrangement is of a nature such that the primary movement of torsion bar 30 is of a torsional or twisting movement about its longitudinal axis. With this arrangement an upward force applied to front wheel 11 and lever 14 is transmitted torsionally through torsion bar 30 and results in a downward force on lever 21 and rear wheel 12. Likewise, an upward force applied to rear wheel 12 and lever 21 results in a downward force on lever 14 and front wheel 11. Concomitant with the application of an upward force to either the front wheel 11 or the rear wheel 12, there is an upward force transmitted to each end of the frame 10 from the ends of torsion bar 30 which are operably connected to opposite ends of the frame. Thus the action of torsion bar 30 is of a nature such that whenever the wheel 11 or 12 at one end of the vehicle passes over a change in elevation, there results a simultaneous application of substantially equivalent vertical forces at opposite ends of the frame 10.

At the front end of frame 10 torsion bar 30 is operably connected to the lower lever 14 through an arm 32. Arm 32 is pivotally connected to a bracket 33 mounted on frame 10 and torsion bar 30 is rigidly connected to arm 32 in eccentric relation to the pivotal connection. The outer end of arm 32 is connected to lever 14 through a rod member 34 and a plate 35, there being a resilient connection between rod member 34 and a plate 35. With this construction the pivoting of lever 14 causes pivoting of arm 32 and the resultant twisting of torsion bar 30.

The rear end of torsion bar 30 is also operably connected to frame 10. A transversely extending arm 36, similar to arm 32, is pivotally connected to a bracket 37 mounted on frame 10 and torsion bar 30 is rigidly connected to arm 36 in eccentric relation to the pivotal connection. The inner end of arm 36 is connected to lever 21 by means of a bolt arrangement 38. With this construction pivoting of lever 21 causes pivoting of arm 36 and the resultant twisting of torsion bar 30.

From the description of the foregoing construction it will be seen that vertical movement of either rear wheel 12 will be transmitted through the axle 20 to one or the other of the levers 21 which swing about the connections 23. Vertical swinging motion of either lever 21 effects pivotal movement of one or the other of the arms 36, thereby torsionally twisting the rear end of either of the torsion bars 30 or 31. It will be further seen from the construction thus described that the torsion bars 30 and 31 on each side of the frame 10 connect one front wheel 11 with one rear wheel 12. With this construction a twist or torsional deflection imparted at one end of either of the torsion bars 30 or 31 will be transmitted to the opposite end. This torsional deflection results in the torsion bars 30 and 31 exerting forces in corresponding vertical directions through brackets 33 and 37 to the frame at opposite ends thereof.

It will be noted that each longitudinal torsion bar 30 and 31 connects a front wheel and a rear wheel at the same side of the vehicle and that the front arm 32 extends outwardly from its connection to the torsion bar 30 or 31 whereas the rear arm 36 extends inwardly from its connection to the torsion bar 30 or 31. As the arms 32 and 36 for the front and rear wheels extend from the front and rear of the torsion bars 30 and 31 in opposed or opposite directions, it is seen that the arms 32 and 36 operate to torsionally deflect opposite ends of the torsion bars 30 and 31 in opposite directions in response to vertical motion of the front and rear wheels in corresponding directions. Thus, the torsion bars 30 and 31 will be effective through arms 32 and 36 to transmit vertical forces in corresponding directions to the front and rear ends of the frame 10 in response to vertical motion of either a front or a rear wheel.

Upon being installed torsion bars 30 and 31 are given an initial deflection or twist calculated to apply a load to the front and rear wheels 11 and 12 equal to a substantial part of the sprung weight of the vehicle. As the static load on the front end of frame 10 is normally greater than the load at the rear end of the frame, due to the weight of the engine mounted at the front end of the frame, the front end of the frame would be at a lower elevation unless load compensating means are provided. Furthermore, the elevation of the rear of the frame 10 would vary with the passenger load if load compensating means were not provided. The present invention is not concerned with load compensating means, however, although some form of a load compensating device or means is normally required for a torsion bar suspension system to maintain the frame 10 substantially level with respect to the front and rear wheels 11 and 12. Accordingly, no load compensating device is disclosed herein although it will be understood that a load compensating device is normally required.

With the torsion bars 30 and 31 each given an initial twist, each of the bars has a node in the vicinity of the mid-point because the respective torsional forces applied to the opposite ends of the bar are applied in opposite directions.

Figure 4:
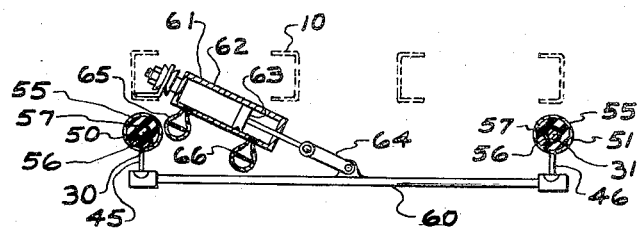
Fig. 4 is a sectional view taken on line IV—IV of Fig. 1.

In accordance with the invention there is provided a roll stabilizer which is cooperable with a vehicle torsion bar suspension system to resiliently resist rolling of the vehicle as it travels around curves. As shown in Fig. 4, crank arms 45 and 46 are provided which are attached to the torsion bar means and, as illustrated herein, are attached respectively to torsion bars 30 and 31. Crank arms 45 and 46 are attached on one side or the other of the nodes of torsion bars 30 and 31 and, as illustrated herein, are attached between the nodes and the arms 36 at the rear end of frame 10.

Crank arms 45 and 46 are positioned to extend in diametrically the same directions and resilient spring means are provided between the crank arms and the torsion bars 30 and 31 which are illustrated herein as rubber bushing members 50 and 51. Each of the rubber bushing members 50 and 51 includes an outer metal sleeve 55 which is rigidly attached to one of the crank arms, an inner metal sleeve 56 which is rigidly attached to the corresponding torsion bar 30 or 31, and an annularly shaped rubber bushing 57 which is bonded to and disposed between sleeves 55 and 56.

When a vehicle which has a torsion bar suspension arrangement as described above turns a corner, the load exerted on the outer side of frame 10 is increased and the load exerted on the inner side of frame 10 is decreased. As a result, the front ends of the torsion bars 30 and 31 twist in a clockwise or counterclockwise direction and the rear ends of the torsion bars twist in the opposite direction. Crank arms 45 and 46, being positioned on one side or the other of the nodes of torsion bars 30 and 31 will therefore both turn in the same direction when the vehicle turns a corner.

Means are provided for connecting crank arms 45 and 46 which include, as illustrated herein, a bar 60 connected to the outer ends of the crank arms. The pivotal movement of the crank arms 45 and 46 together, in one direction or the other, causes bar 60 to move in a corresponding direction longitudinally of the bar 60. In effect bar 60 prevents relative angular movement between crank arms 45 and 46.

Connected to bar 60 are means for resiliently resisting pivotal movement of crank arms 45 and 46 when the crank arms have the same direction of pivotal movement. These means are illustrated herein as a double acting expansible chamber device 61 which is operably connected between bar 60 and the frame 10 and includes a cylinder 62 and a piston 63. Rod means 64 is provided for connecting piston 63 to bar 60. At opposite ends of cylinder 62 are provided gas accumulators 65 and 66. Each accumulator has two compartments separated by a diaphragm with one compartment being in communication with the inside of the cylinder 62 and the other compartment filled with a gas under pressure. Cylinder 62 is filled with a hydraulic fluid and the normal pressure in the cylinder may be on the order of 600 p. s. i.

When a vehicle in which the above described apparatus is installed turns a corner, the torsion bars 30 and 31 will twist so that crank arms 45 and 46 pivot in one direction or the other. This pivotal movement is transmitted to piston 63 through bar 60 and the movement of the piston is resiliently resisted by one of the accumulators 65 or 66. The surge pressure due to the roll of the vehicle may amount to about 3000 to 4000 p. s. i. Accordingly the accumulators 65 and 66 function to resiliently resist rolling of the vehicle and to exert restoring forces to return the vehicle to a level position when rolling of the vehicle does occur.

It will be appreciated that the action of the roll stabilizer should not interfere with the transmission of torsional forces between the opposite ends of the torsion bars as this would defeat the fundamental purpose of the torsion bars. Rubber bushings 50 and 51 are provided respectively between crank arms 45 and 46 and torsion bars 30 and 31 to avoid this interference. It will be understood, however, that other resilient means or arrangement may also be provided within the scope of the invention to serve the same purpose.

It will also be understood that the roll stabilizer arrangement described above may be provided on either side of the nodes of the torsion bars 30 and 31. Or, if desired, a dual arrangement may be provided wherein a roll stabilizer arrangement may be provided on each side of the nodes of the torsion bars 30 and 31.

The invention may be embodied in other specific forms without departing from the spirit or essential characteristics thereof. The present embodiment of the invention is therefore to be considered in all respects as illustrative and not restrictive, the scope of the invention being indicated by the appended claim rather than by the foregoing description, and all changes which come within the meaning and range of equivalency of the claim are therefore intended to be embraced therein.

It is claimed and desired to secure by Letters Patent:

A vehicle suspension system comprising a load carrying frame, front and rear longitudinally spaced wheels, front and rear lever means connecting said wheels to said frame, torsion bar means operably connected to said levers including first and second torsion bar spring means respectively connecting the lever means on each side of said frame, crank arm means connected to said first and second torsion bar spring means longitudinally between the midportions thereof and the levers at one end of said frame, said crank arm means extending diametrically in the same directions, resilient crank arm mounting means disposed between said crank arm means and said first and second torsion bar spring means, a bar connecting said crank arm means, a piston and cylinder device operably connected between said bar and said frame, accumulator means at each end of said cylinder for resiliently resisting relative movement between the piston and cylinder in either direction.

References Cited in the file of this patent

UNITED STATES PATENTS

| | | |
|---|---|---|
| 2,083,381 | Hutchison | June 8, 1937 |
| 2,536,769 | Rix | Jan. 2, 1951 |
| 2,577,761 | Hickman | Dec. 11, 1951 |